United States Patent [19]

Takahashi et al.

[11] 3,895,816
[45] July 22, 1975

[54] VEHICLE-ATTITUDE CONTROL DEVICE

[75] Inventors: Noriyuki Takahashi; Hiromitsu Miyahara, both of Tokyo; Hidehiko Inoue, Oimachi, all of Japan

[73] Assignee: Honda Giken Kogyo Kabushiki Kaisha, Tokyo, Japan

[22] Filed: Mar. 8, 1974

[21] Appl. No.: 449,468

[30] Foreign Application Priority Data
  Mar. 12, 1973 Japan.................. 48-28783

[52] U.S. Cl.................. 280/6 H; 267/64 A
[51] Int. Cl.[2]................. B60G 13/08
[58] Field of Search ........ 280/124 F, 112 R, 112 A, 280/6 H; 267/64 R, 64 A, 65 R, 65 A; 137/46

[56] References Cited
UNITED STATES PATENTS

| 2,903,271 | 9/1959 | Vogel | 280/112 A |
| 3,533,425 | 10/1970 | Hannan | 137/46 |
| 3,582,106 | 6/1971 | Keijzer | 280/124 F |
| 3,736,000 | 5/1973 | Capgras | 280/124 F |
| 3,752,497 | 8/1973 | Enke | 280/124 F |
| 3,778,081 | 12/1973 | Takahashi et al. | 280/112 A |

Primary Examiner—Philip Goodman
Assistant Examiner—John A. Carroll
Attorney, Agent, or Firm—Waters, Schwartz & Nissen

[57] ABSTRACT

A vehicle-attitude control device including telescopic shock absorbers adapted to additionally serve the purpose of vehicle height control and means for controlling the amount of oil held in the shock absorbers in a manner such that the vehicle is tilted during travel along a curved course in a direction opposite to that of lateral swing ordinarily occurring under the centrifugal effect. The vehicle-height controlling function is automatically interrupted when the vehicle is subjected to the centrifugal effect.

10 Claims, 2 Drawing Figures

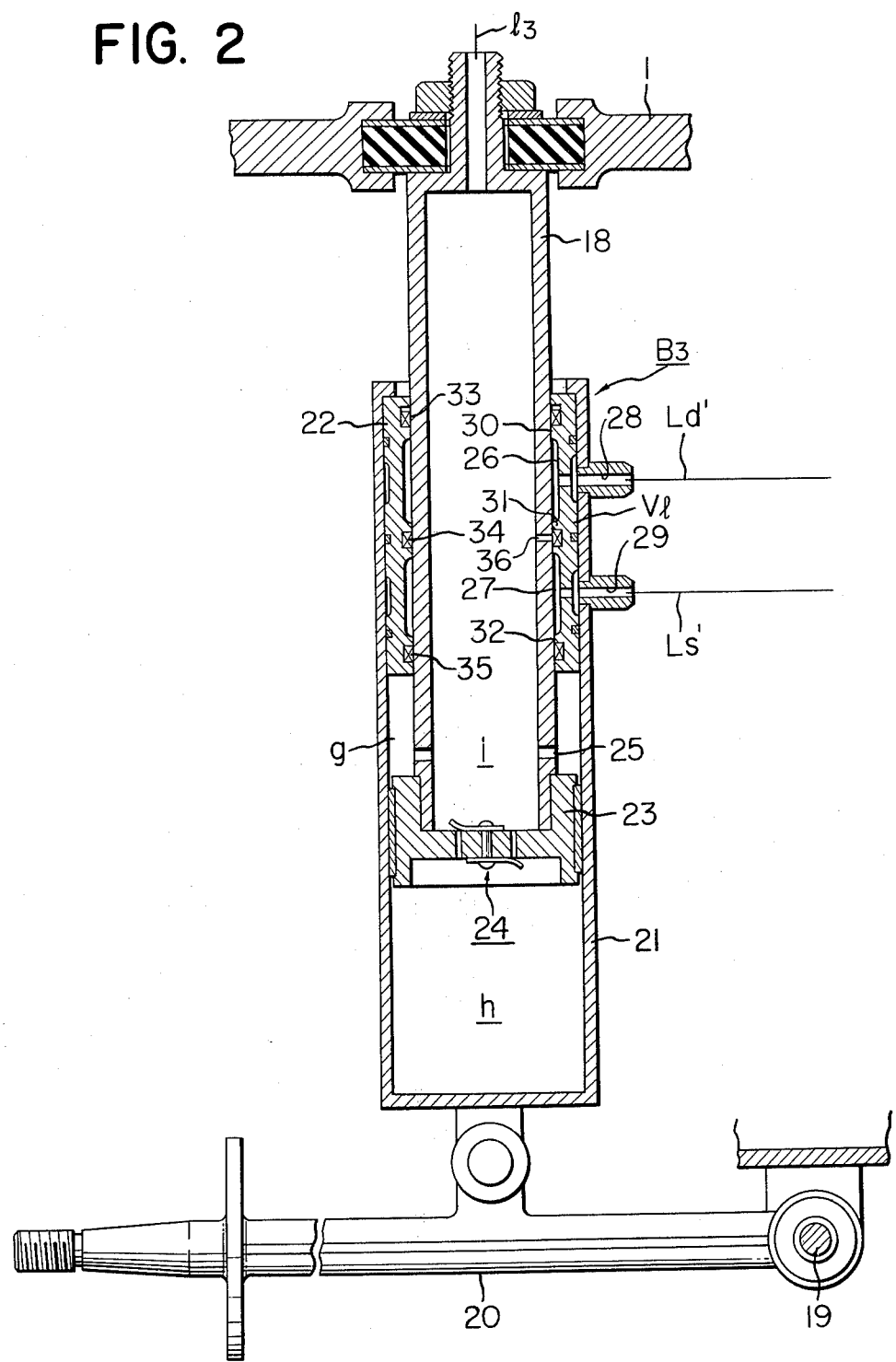

VEHICLE-ATTITUDE CONTROL DEVICE

BACKGROUND OF THE INVENTION

This invention relates to vehicle-attitude controls for vehicles such as an automobile and designed to enable the vehicle automatically to assume a stable running attitude particularly when turning along a curved course and to maintain the height of the vehicle body from the ground at all times at a predetermined normal level irrespective of the load condition.

Generally, when a vehicle travels at high speed along a curved course, it tilts outwardly under the centrifugal effect, rising on the inside while descending on the outside. Moreover, when the weight of passenger and/or luggage load is changed or such weight is unevenly distributed, the vehicle varies in height or tilts sidewise accordingly, and any excessive tilt or variation in vehicle height not only impairs riding comfort but results in substantial displacement of the center of gravity of the vehicle, which involves the danger of the vehicle overturning sidewise.

SUMMARY OF THE INVENTION

In view of the above, the present invention is intended to provide a new and improved vehicle-attitude control device which includes telescopic shock absorbers arranged between the frame and respective road wheels of the vehicle and particularly adapted to serve also as hydraulic cylinder units individually operable to raise and lower the vehicle frame and is thus capable of automatically controlling the height and sidewise inclination of the vehicle to keep it at all times in a stable running attitude.

The above and other objects, features and advantages of the present invention will become apparent from the following description when taken in conjunction with the accompanying drawings.

BRIEF DESCRIPTION OF THE DRAWINGS

In the drawings:

FIG. 2 is an axial cross-sectional view of one of the telescopic shock absorbers forming the essential part of the device shown in FIG. 1.

DESCRIPTION OF THE PREFERRED EMBODIMENT

Figure 1:
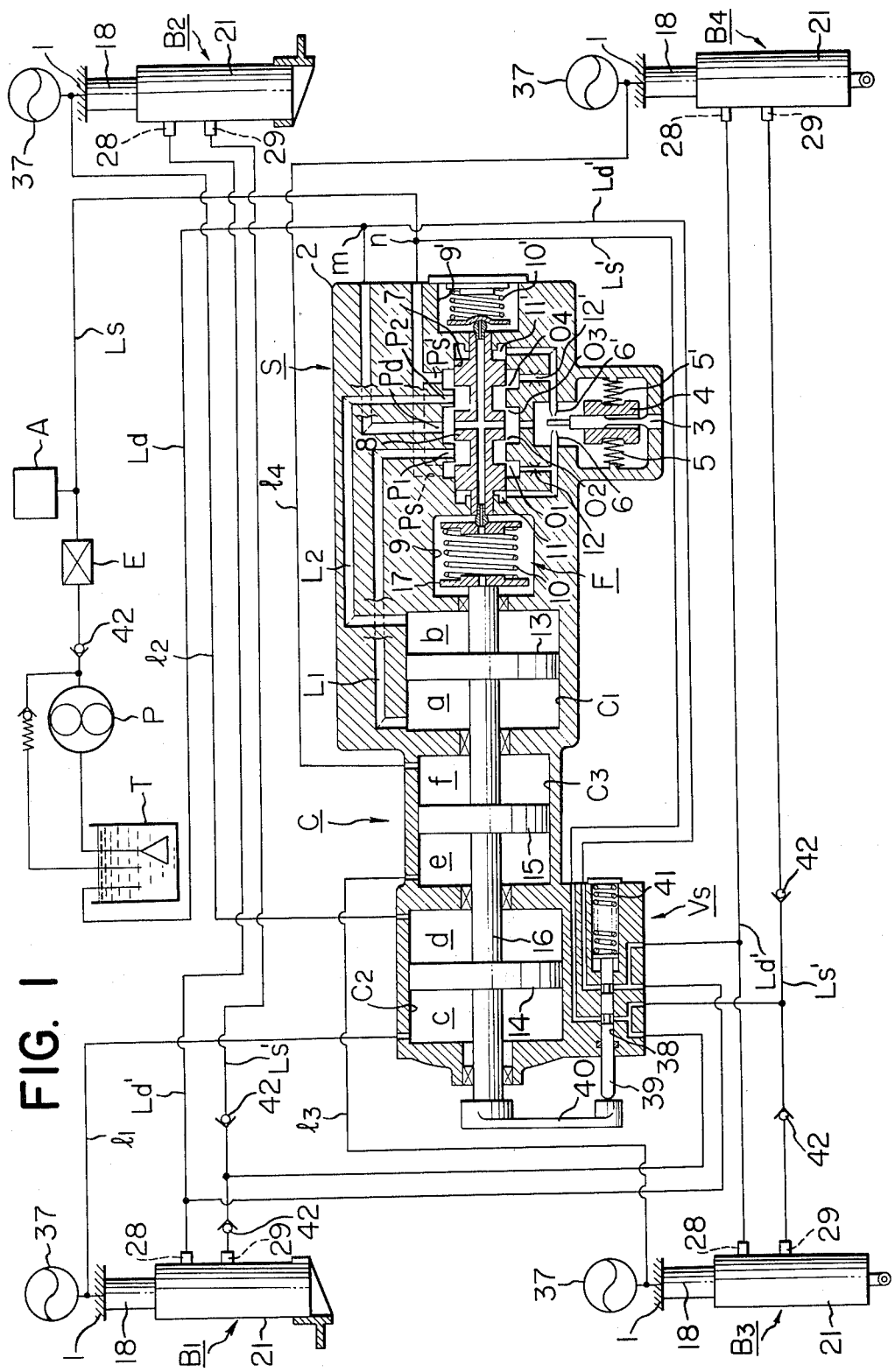
FIG. 1 is a partly schematic cross-sectional view, diagrammatically illustrating a preferred embodiment of the invention.

Referring to the drawings, there is illustrated a vehicle-attitude control device which includes, as its major components, two pairs of front and rear telescopic shock absorbers $B_1$–$B_2$ and $B_3$–$B_4$ arranged between the vehicle frame 1 and respective pairs of front and rear road wheels, not shown, a vehicle-height control valve Vl provided on each of the shock absorbers and operable controllably to increase and decrease the amount of oil held in the associated shock absorber upon sensing the extension and contraction thereof, means S for sensing the centrifugal force acting upon the vehicle when it travels along a curved course and producing an output signal in the form of a pressure fluid, an oil-hydraulic cylinder assembly C operable upon reception of the output signal from said centrigual force sensing means to control the amount of oil in the individual shock absorbers $B_1$, $B_2$, $B_3$ and $B_4$ in an increasing and a decreasing direction, feedback means F for feeding back the output of said oil-hydraulic cylinder assembly C to the centrifugal force sensing means S, and a cutoff valve Vs operable in response to the operation of said oil-hydraulic cylinder assembly C to render the vehicle-height control valve Vl inoperative.

Referring to FIG. 1, first, the construction and arrangement of the centrifugal force sensing means S will be described in detail. The sensor means S includes a casing 2 arranged at an appropriate location on the vehicle frame 1 and a control rod 3 of resilient material fixed at the bottom to the sensor casing 1. A weight mass 4 is slidably fitted over the control rod 3 intermediate the ends thereof so that the latter may oscillate laterally under the effect of the centrifugal force occurring when the vehicle travels along a curved course. The weight mass 4 is normally held in a neutral position under the bias of a pair of counterbalancing coiled springs 5 to hold the control rod 3 in its normal, vertical position extending at the top between a pair of oil nozzles 6 and 6' arranged with their orifices facing against each other at equal distances therefrom. Defined in the central portion of the sensor casing 2 is a valve chamber 7 in which a spool valve 8 is accommodated. The spool valve 8 has opposite end portions reduced in diameter and extending into respective spring chambers 9 and 9', formed on the opposite sides of the valve chamber 7, and is biased in opposite directions by a pair of counter-balancing coiled springs 10 and 10', accommodated in the respective spring chambers 9 and 9', so as to be normally held in a neutral position. Pressure chambers 11 and 11' are defined at the opposite ends of the valve chamber 7 by the opposite end walls thereof and adjacent land portions of the spool valve 8. Also, the valve chamber 7 is provided with a pair of left and right oil inlet ports $Ps$ and $Ps'$, a first and a second oil output ports $P_1$ and $P_2$ lying adjacent to the respective oil inlet ports on the inside thereof, and an oil exhaust port Pd lying between the first and second oil output ports. Formed between the respective adjacent ports are control orifices $O_1$, $O_2$, $O_3$ and $O_4$ which are each adjustable in area by the adjoining land portions of the spool valve 8. The oil inlet ports Ps and Ps' are connected with a common oil supply line Ls leading from the delivery port of an oil pressure pump P and one of the two oil inlet ports, Ps, is in fluid communication with the left oil nozzle 6 and hence the left pressure chamber 11 by way of an orifce 12 formed in the spool valve 8 while the other oil inlet port $Ps'$ is in fluid communication with the right oil nozzle 6' and hence the right pressure chamber 11' by way of another orifice 12' formed in the spool valve 8. With this arrangement, pressure oil is normally discharged through the oil nozzles 6 and 6' in opposite directions against the control rod 3. The first and second oil output ports $P_1$ and $P_2$ are in fluid communication with the opposite spaces in a hydraulic drive cylinder $C_1$, described hereinafter, of the hydraulic cylinder assembly C through a first and a second oil output line $L_1$ and $L_2$, respectively. The oil exhaust port Pd is connected with an exhaust oil line Ld opening to an oil reservoir tank T, as shown.

The oil-hydraulic cylinder assembly C is comprised of drive cylinder $C_1$ and a pair of left and right driven cylinders $C_2$ and $C_3$. The interior space of drive cylinder $C_1$ is divided into two chambers a and b by a drive piston 13 slidably accommodated therein, the two chambers a and b communicating with the first and second oil ouput lines $L_1$ and $L_2$, respectively, as described above. One of the driven cylinders, that is, the left driven cylinder $C_2$, accommodates a driven piston 14 which divides the cylinder space into left and right chambers $c$ and $d$, respectively communicating with the telescopic shock absorbers $B_1$ and $B_2$ by way of respective connecting lines $l_1$ and $l_2$. The other, right driven cylinder $C_3$ accommodates a driven piston 15, which divides the cylinder space into left and right chambers $e$ and $f$, respectively communicating with the other shock absorbers, $B_3$ and $B_4$ by way of respective connecting lines $l_3$ and $l_4$. As shown, the drive piston 13 and driven pistons 14 and 15 are formed on a common piston rod 16 extending through the cylinders $C_1$, $C_2$ and $C_3$.

The feedback means F includes a movable seat disc 17 secured to the right-hand end of the piston rod 16, which extends into the spring chamber 9, and on which disc the left counterbalancing coiled spring 10 is seated at its left end so that its compressive force is adjustable by axial displacement of the piston rod 16.

Description will next be made of the construction of telescopic shock absorbers $B_1$, $B_2$, $B_3$ and $B_4$, all of substantially the same construction, with reference to FIG. 2, which illustrates one of such shock absorbers, $B_3$, which is arranged on the rear left portion of the vehicle.

Referring to FIG. 2, the shock absorber $B_3$ is principally constituted by an inner tubular member or cylinder 18 supported at the top on the vehicle frame 1 and an outer tubular member or cylinder 21 connected at the bottom with the adjacent wheel, not shown, through the medium of a swing axle 20 pivoted to the vehicle frame 1 as at 19. The inner cylinder 18 is slidably supported by a bearing sleeve 22 firmly fitted in the open top portion of the outer cylinder 21 and a slide piston 23 is fixed to the bottom end of the inner cylinder 18 and slidably fitted in the outer cylinder 21 so as to divide the interior space thereof into upper and lower chambers $g$ and $h$. The slide piston 23 is provided conventionally with a buffer valve 24 serving to control fluid communication between the upper and lower chambers $g$ and $h$. Incidentially, the upper chamber $g$ is in fluid communication with an intermediary space $i$ in the form of the hollow of the inner cylinder 18 through apertures 25 formed in the side wall thereof. The bearing sleeve 22 is formed with a pair of upper and lower annular grooves 26 and 27 in the inner peripheral surface thereof. The upper and lower annular grooves 26 and 27 are in communication with an oil outlet and an oil inlet port 28 and 29, respectively, which are formed in the side wall of the outer cylinder 21 and respectively connected with branch lines $Ls'$ and $Ld'$ branching from the oil supply and exhaust lines $Ls$ and $Ld$, respectively, at points $n$ and $m$ (FIG. 1). Seal members 33, 34 and 35 are fitted in the respective land portions 30, 31 and 32 of the bearing sleeve 22, which jointly define the upper and lower annular grooves 26 and 27. The central land portion 31, having a predetermined axial width, forms a vehicle-height control valve $Vl$ together with a through aperture 36 formed in the side wall of the inner cylinder 18. It is to be understood that the through aperture 36 is designed to present a resistance to fluid flow larger than that of buffer valve 24. The inner cylinder 18 communicates at the top with an accumulator 37 (FIG. 1) having a pressure gas chamber at the top thereof so that any variation in amount of oil held in the outer cylinder occurring with the axial displacement of the inner cylinder 18 relative thereto is effectively compensated for by such accumulator 37.

Referring again to FIG. 1, description will next be made of the construction and arrangement of the cutoff valve Vs. As shown, this valve is comprised of a valve chamber 38 formed in the oil-hydraulic cylinder assembly C laterally thereof and a spool valve element 39 slidably fitted in the valve chamber 38. The branch oil supply and exhaust lines $Ls'$ and $Ld'$, described hereinbefore, are formed to extend across the valve chamber 38 so as to be opened and closed under the control of spool valve 39. The spool valve 39 is held at the left end in engagement with an actuator arm 40 formed integral with the piston rod 16 at the left end thereof under the bias of a compression coil spring 41, arranged adjacent to the other end of the spool valve 39, so as to follow the actuator arm 40, which is movable right and left together with the piston rod 16.

Again in FIG. 1, reference numeral 42 designates non-return valves provided in oil supply lines $Ls$ and $Ls'$; and reference characters A and E designate a main accumulator and an oil filter, respectively.

Description will next be made of operation of the device described above.

VEHICLE-HEIGHT CONTROL

When standing still or running straight, the vehicle is of course under no centrifugal effect and the centrifugal force sensor means S and oil-hydraulic cylinder assembly C are in their neutral, inoperative position shown in FIG. 1. Accordingly, the spool valve element 39 of the cutoff valve Vs remains in its netural position keeping the oil supply and exhaust branches $Ls'$ and $Ld'$ open. If in this state the vehicle has its normal height, the through aperture 36 in the wall of inner cylinder 18 lies within the range of central land portion 31 of the bearing sleeve 22, as shown in FIG. 2, closing off communication between the intermediary chamber $i$ and the upper and lower annular grooves 26 and 27.

Now assuming that the passenger or luggage load is increased and the vehicle height is reduced below the normal level, lowering the inner cylinder 18 in each of the shock absorbers relative to the associated outer cylinder 21, the through aperture 36 is moved down from the lower edge of central land portion 31 of the bearing sleeve 22 to communicate with the lower annular groove 27 therein. This enables pressure oil to be fed from the oil supply branch line $Ls'$ to the intermediary chamber $i$ through the oil inlet port 29, lower annular groove 27 and aperture 36 and further to the upper and lower chambers $g$ and $h$ of the outer cylinder 21 through the apertures 25 and buffer valve 24 to apply oil pressure to the top and bottom faces of the slide piston 23. As a result, the slide piston 23, with its top face exposed to the pressure oil in an area smaller than its bottom face, is driven upward to restore the through aperture 36 to its normal position closed by the central land portion 31 of bearing sleeve 22 and, in this manner, the vehicle restores its normal height. Obviously, at this instant, the flow of pressure oil into the intermediary chamber $i$ is interrupted causing the slide piston 23 to stop at its normal, raised position.

Contrariwise, if the load on the vehicle is reduced so as to increase the vehicle height above the normal level, the through aperture 36 is brought into communication this time with the upper annular groove 26 in the bearing sleeve to place the intermediary chamber $i$ in communication with the exhaust branch line $Ld'$ and thus the intermediary chamber $i$ is exhausted. As a result, the slide piston 23 is driven oppositely downward until the normal height of the vehicle is restored. Incidentally, the shock absorbers $B_1$, $B_2$, $B_3$ and $B_4$ in this device are operable independently from each other to correct the vehicle height in the manner described so that with the device any lateral inclination of the vehicle frame 1 as occurring with onesided load or sudden brake engagement can also be automatically corrected.

SHOCK ABSORBING FUNCTION

During travel of the vehicle, if the rod wheels thereof oscillate up and down on account of an irregular road surface, the shock absorbers $B_1$, $B_2$, $B_3$ and $B_4$ associated with the respective wheels are extended and contracted accordingly but the oil flowing between the upper and lower chambers $g$ and $h$ with such absorber movement is appropriately resisted by the buffer valve 24 provided therebetween so that any vibration or shock to the vehicle frame 1 can be alleviated as with the case of conventional shock absorbers. In such extending and contracting movement of the shock absorbers $B_1$, $B_2$, $B_3$ and $B_4$, the through aperture 36 in the wall of the inner cylinder 18 may be placed in communication alternately with the upper and lower annular grooves 26 and 27 in the bearing sleeve 22 but since the frequency of such extending and contracting movement of the shock absorbers is relatively high and the flow resistance of the through aperture 36 is substantial, the amount of oil flowing through the aperture 36 in either direction is extremely limited, enabling the shock absorbers satisfactorily to serve the intended shock-absorbing function.

LATERAL SWING CONTROL DURING TRAVEL ALONG CURVED COURSES

Assuming that the vehicle is steered to turn, for example, to the left, it is laterally swung under the centrifugal effect to rise on the left side while falling on the right side. On this occasion, the centrifugal force sensor means S operates with its weight mass 4 swinging to the right together with the control rod 3 under the centrifugal effect. Accordingly, the top, free end of the control rod 3 is moved away from the left-hand oil nozzle 6 (FIG. 1) to reduce its resistance to the jet flow therefrom and, thus approaching the right-hand oil nozzle 6' increases its resistance to the jet flow therefrom. As a consequence, the oil pressure in the left pressure chamber 11 is reduced and that in the right pressure chamber 11' is increased so that under the differential oil pressure the spool valve 8 is displaced to the left thereby to increase the opening of control orifices $O_1$ and $O_3$ while reducing or nullifying the opening of control orifices $O_2$ and $O_4$. Accordingly, most of the pressure oil flowing through the oil supply port Ps is directed through the first oil output port $P_1$ and first oil output line $L_1$ into the left chamber $a$ of the drive cylinder $C_1$. Meanwhile, the oil in the right chamber $b$ is directed through the second oil output line $L_2$ and second oil output port $P_2$ to the oil exhaust port Pd with the result that the drive piston 13 is displaced from its neutral position to the right, driving the driven pistons 14 and 15 in the same direction. Thereupon, the actuator arm 40, formed integral with the piston rod 16, causes the spool valve element 39 to move rightward form its neutral position thereby to close the oil supply and exhaust branch lines $Ls'$ and $Ld'$ and oil in the right chambers $d$ and $f$ of the respective driven cylinders $C_2$ and $C_3$ is forced to flow through the connecting lines $l_2$ and $l_4$ into the front and rear shock absorbers $B_2$ and $B_4$, associated with the respective right-hand side wheels of the vehicle, to extend such shock absorbers. At the same time with this, oil is drawn from the left-hand side shock absorbers $B_1$ and $B_3$ into the left chambers $c$ and $e$ of the respective driven cylinders $C_2$ and $C_3$ through the connecting lines $l_1$ and $l_3$, allowing the shock absorbers $B_1$ and $B_3$ to contract. As a result, the vehicle frame 1 is restored to its normal horizontal position or is tilted to the inside of the curved course of travel, rising on the outside while falling on the inside to assume a turning attitude like that of a motorcycle.

During such lateral swing control of the vehicle frame 1, the through aperture 36 in the respective shock absorber $B_1$, $B_2$, $B_3$ or $B_4$ may be placed in communication with the upper or lower annular groove 26 or 27 in the associated bearing sleeve 22. However, the branch lines $Ls'$ and $Ld'$ are closed at the start of movement of drive piston 13 by means of the cutoff valve Vs, as described above, and thus the connecting lines $l_1$, $l_2$, $l_3$ and $l_4$ extending between the driven cylinders $C_2$ and $C_3$ on the one hand and the shock absorbers $B_1$–$B_2$ and $B_3$–$B_4$ on the other hand are substantially closed, enabling the driven pistons 14 and 15 to operate to efficiently control the length of the shock absorbers in an increasing or decreasing direction.

As the attitude of the vehicle frame 1 is controlled to a predetermined angle of inclination, the spool valve 8 is forced back toward its netural position by the movable seat disc 17, fixed to the right-hand end of the piston rod 16, through the intermediary of the left counterbalancing spring 10 so that the oil supply to the left chamber $a$ of the drive cylinder $C_1$ and the oil exhaust from the right chamber $b$ thereof are substantially terminated. In this manner, the drive piston 13 is held against any further rightward displacement and any excessive tilt of the vehicle 1 under the action of the oil-hydraulic cylinder assembly C is effectively prevented.

It will be apparent that, when the vehicle is steered to turn to the right, the respective components of the device operation in the reverse direction, but in just the same fashion as described above, again to impart a stable running attitude to the vehicle.

To summarize, according to the present invention, the amount of oil in the respective telescopic shock absorbers $B_1$, $B_2$, $B_3$ and $B_4$, arranged between the vehicle frame 1 and road wheels of the vehicle is controlled so as to automatically correct the vehicle height and prevent any lateral swing of the vehicle as occurring under the centrifugal effect when it travels along a curved course and in this manner the vehicle can assume a stable running attitude at all times. Particularly, when the vehicle is placed under the centrifugal effect, the vehicle-height controlling function of the device is interrupted so that any leakage of pressure oil acting to control the lateral inclination of the vehicle is effectively prevented to enable rapid and accurate control of lateral swing of the vehicle. In addition, the shock absorbers used in the device of the present invention are designed, as described herein, to serve the dual purpose of shock absorption and vehicle-height control and this apparently simplifies the construction and arrangement of the whole device to an extreme extent.

While one preferred embodiment of the present invention has been shown and described, it will be apparent to those skilled in the art that many changes and modifications may be made therein without departing from the spirit of the invention or from the scope of the appended claims.

We claim:

1. A vehicle-attitude control device for an automotive vehicle having a frame and wheels, said device comprising: centrifugal force sensing means operable to produce an output signal upon sensing a centrifugal force occurring when the vehicle travels along a curved course; telescopic shock absorbers arranged in left and right pairs between the frame and respective wheels of the vehicle; means operable upon reception of said output signal to controllably increase and decrease the amount of fluid in the left and right pairs of said shock absorbers thereby to tilt the vehicle frame laterally in a direction opposite to the direction of lateral swing ordinarily occurring under the action of said centrifugal force; vehicle-height controlling valve means associated with said respective shock absorbers and each operable to feed the associated shock absorber with pressure fluid upon contraction thereof below a predetermined length and to cause fluid exhaust from the associated shock absorber upon extension thereof above a predetermined length; and means operable to automatically render said vehicle-height controlling valve means ineffective upon operation of said centrifugal force sensing means.

2. A device as claimed in claim 1 wherein said means to increase and decrease the amount of fluid in the left and right pairs of shock absorbers comprises a cylinder for each left and right pair of shock absorbers, a piston slidable in said cylinder and dividing the same into respective chambers, and means connecting each chamber to a respective shock absorber.

3. A device as claimed in claim 2 comprising a common piston rod for the pistons of the left and right pairs of shock absorbers.

4. A device as claimed in claim 3 comprising means responding to said output signal from the centrifugal force sensing means for displacing said piston rod and thereby the pistons thereon to vary the sizes of said chambers and thereby regulate fluid feed to and from the left and right shock absorbers of said pairs to effect lateral tilting of the vehicle frame.

5. A device as claimed in claim 4 wherein each said shock absorber has an inlet for connection to a source of pressure fluid and an outlet for connection to exhaust, said means to render the vehicle-height controlling valve means ineffective comprising a valve arrangement coupled to said piston rod and operated thereby to selectively block the inlets and outlets of the shock absorbers.

6. A device as claimed in claim 4 wherein said means responding to said output signal from the centrifugal force sensing means comprises a further cylinder, a further piston, slidable in said further cylinder, said further piston being mounted on said common piston rod and dividing said further cylinder into respective chambers, and means subject to the action of said output signal to vary the pressure in the respective chambers of the further cylinder to produce displacement of said piston rod.

7. A device as claimed in claim 6 wherein said means subject to the action of the output signal comprises a spool valve controlling flow of pressure fluid to said chambers of the further cylinder.

8. A device as claimed in claim 7 wherein said centrifugal force sensing means comprises a weight member which is displaced under the action of centrifugal force, and means coupled to the weight member and the spool valve to displace the latter in relation to the displacement of the weight member.

9. A device as claimed in claim 5 wherein said shock absorbers each comprises a hollow outer cylinder, and a hollow inner cylinder slidably mounted in the outer cylinder, said cylinders defining respective chambers therebetween, said height-controlling valve means comprising a valve member disposed between said chambers and selectively controlling flow to and from one of said chambers to said inlet and outlet.

10. A device as claimed in claim 9 wherein the chambers of each cylinder of the means which increases and decreases the amount of fluid in the left and right pairs of shock absorbers are connected to a respective one of the chambers of the associated shock absorber.

* * * * *